Figure 6:
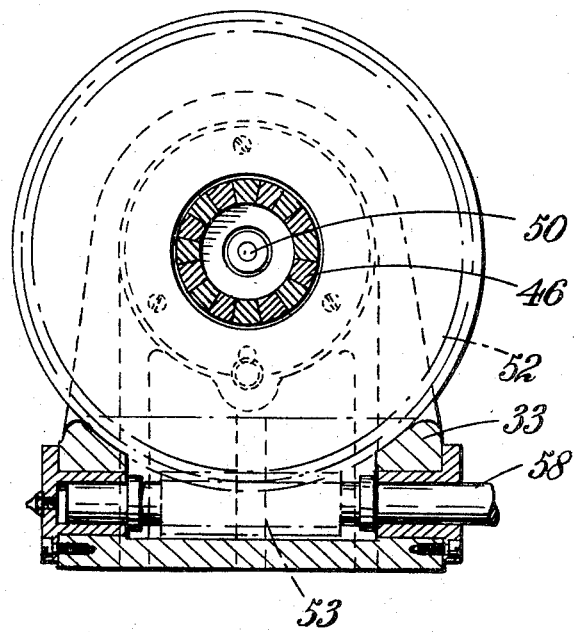

Oct. 24, 1950     F. W. WHITEHEAD ET AL     2,527,285
GRINDING, MILLING, OR THE LIKE MACHINE FOR PRODUCING
PARTS OF COMPLEX SHAPE, MORE PARTICULARLY THE
BLADES OF AXIAL COMPRESSORS OR TURBINES
Filed March 1, 1948     5 Sheets-Sheet 1
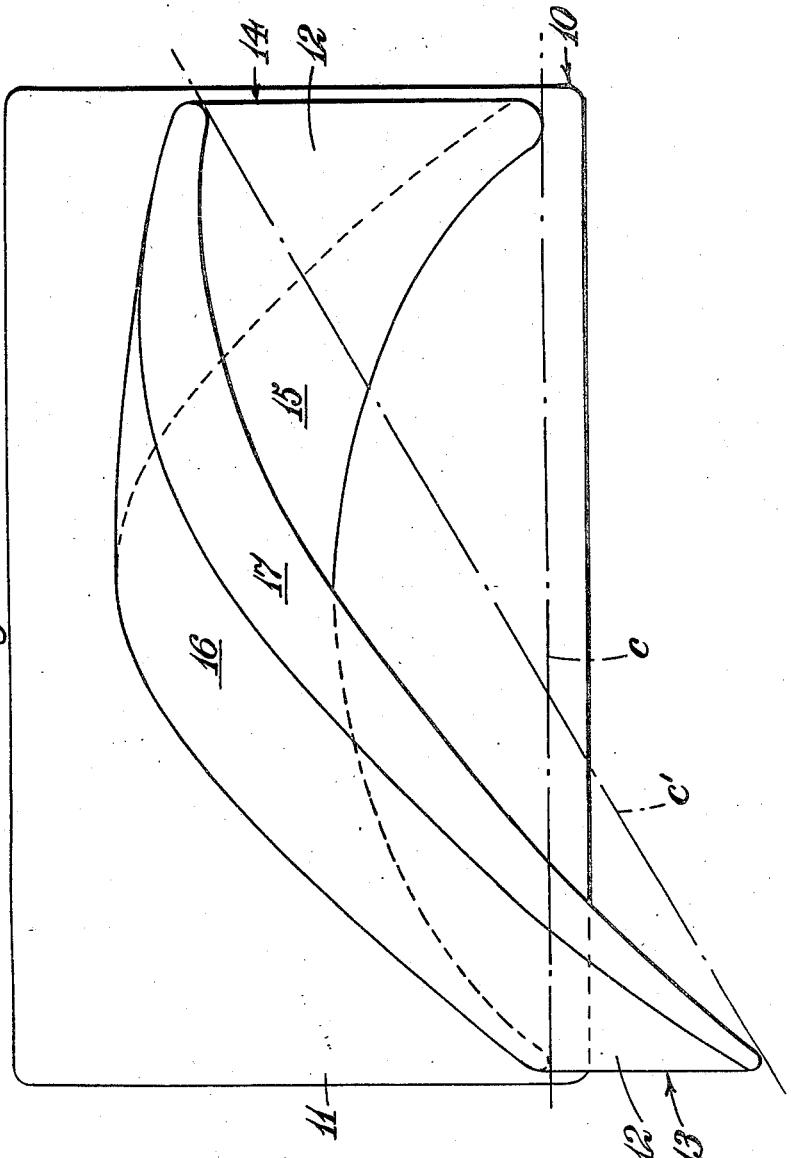
INVENTORS
FREDERICK W. WHITEHEAD
& WILLIAM H. BEDFORD
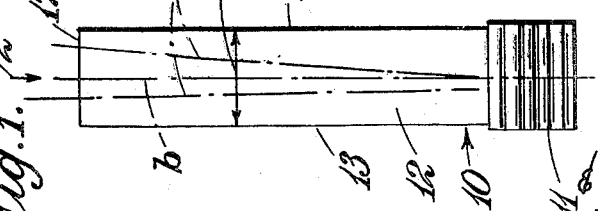
ATTORNEYS

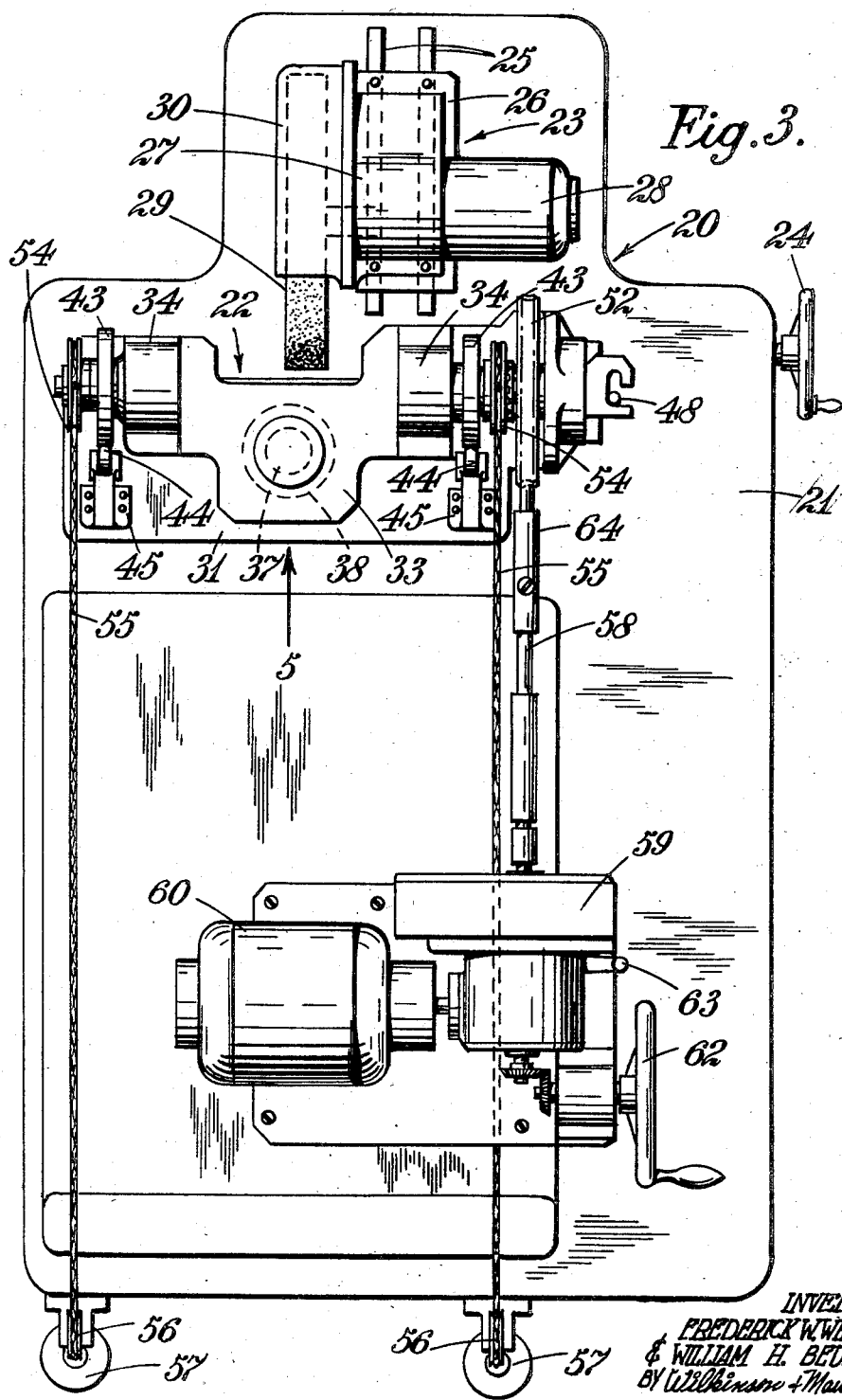

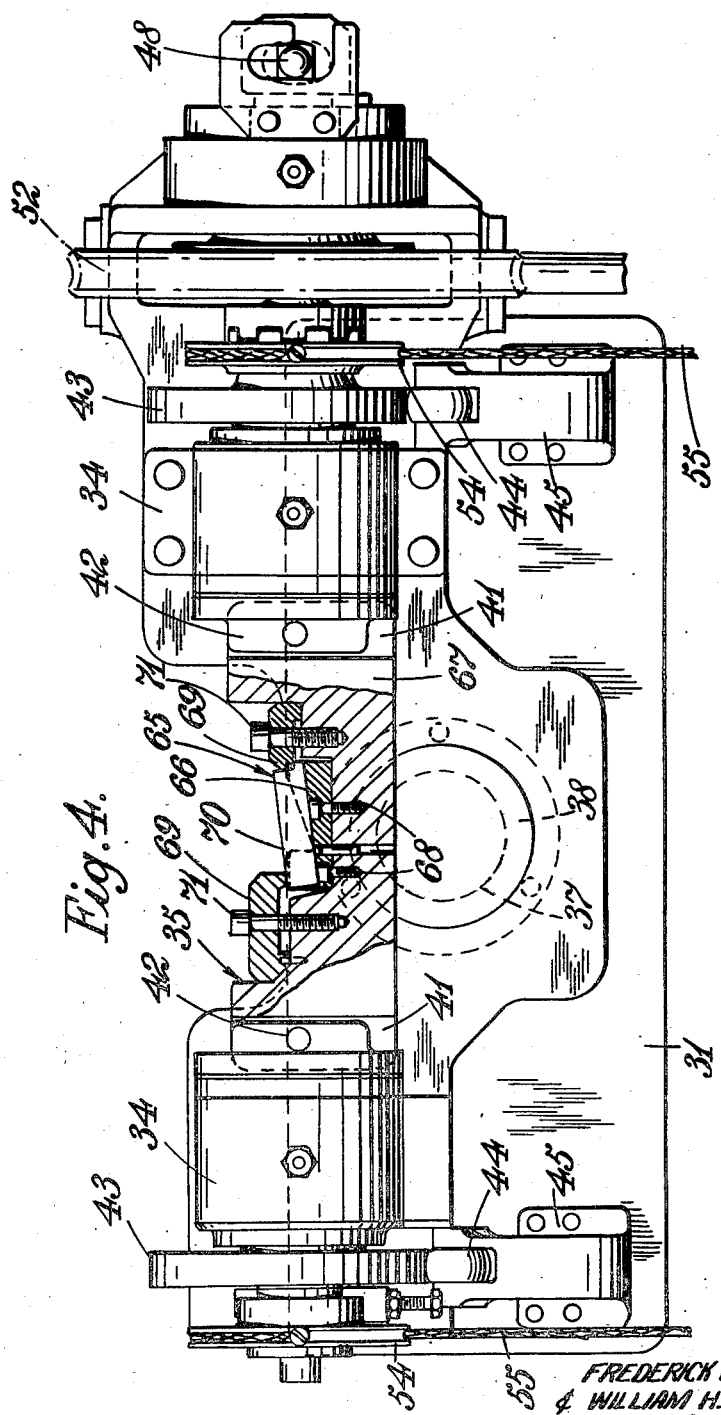

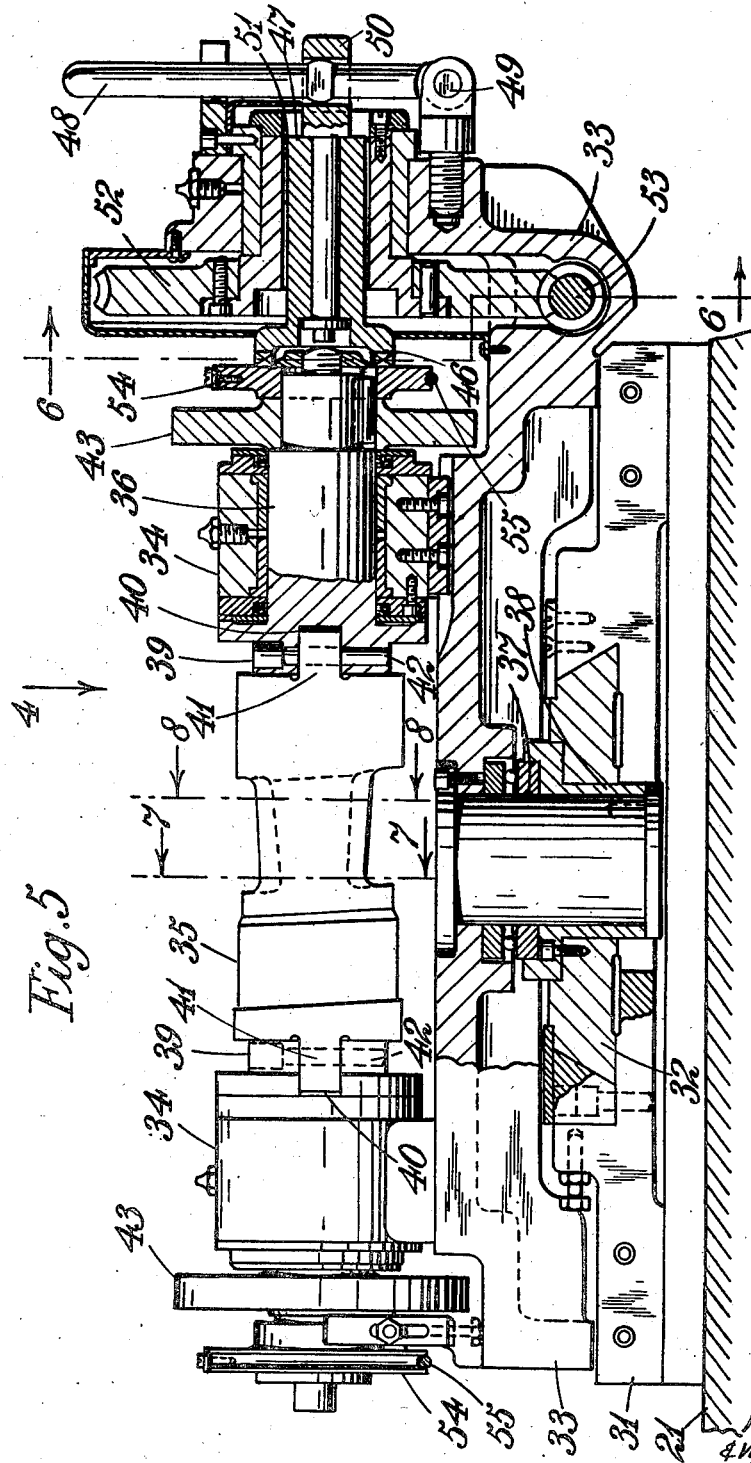

Patented Oct. 24, 1950

2,527,285

UNITED STATES PATENT OFFICE 2,527,285

GRINDING, MILLING, OR THE LIKE MACHINE FOR PRODUCING PARTS OF COMPLEX SHAPE, MORE PARTICULARLY THE BLADES OF AXIAL COMPRESSORS OR TURBINES

Frederick William Whitehead and William Henry Bedford, Bristol, England, assignors to The Bristol Aeroplane Company Limited, Bristol, England, a British company Application March 1, 1948, Serial No. 12,346
In Great Britain March 18, 1947

3 Claims. (Cl. 51—101)

This invention concerns milling, grinding or the like machines and has for its object to provide a simple machine for producing parts of complex shape.

Another object of the invention is to provide a machine for producing the blades of axial compressors or of turbines from a solid bar or rod by milling, grinding or the like operation. This feature is of particular advantage since the bar stock may be readily and cheaply produced either by cold drawing or by forging so that in either case it has great strength: the blade will then also have this characteristic. Such a characteristic is particularly sought for when the blade forms part of a gas turbine rotor which is subjected both to very high temperatures and speeds of rotation.

According to one aspect of the present invention a machine for producing convex surfaces of complex shape by milling, grinding or the like with a rotary tool having a peripheral cutting face comprises a bed, a tool-head mounted on the bed, means for driving the rotary tool, a work-head carrying a work-piece holder for movement tangentially across the cutting face of the tool, a frame to support the holder for oscillation to incline the work-piece relatively to the cylindrical cutting face, a slide to support the frame for reciprocation to carry the work-piece towards and away from the cutting face, a pair of mechanisms for converting rotary to sliding motion said mechanisms lying one on each side of the work-piece and means for driving the work-piece holder together with said mechanisms, the latter acting each on said slide to oscillate and/or reciprocate it.

The machine is particularly adapted for milling, grinding honing or similarly machining coincident-line blades as hereinafter defined.

According to another aspect of the present invention a milling, grinding, honing or the like machine for producing or finishing the convex surface of coincident-line blades comprises a bed, a work-head and a tool-head carried by the bed, a work-holder mounted on the work-head for angular movement about two axes normal to each other, one axis being selected so that the coincident lines of the blade are always parallel to it, a cylindrical-faced rotary tool carried by the tool-head and having a face width at least equal to the length of the blade said tool being mounted to engage the blade along a coincident line, means for driving the tool, means for moving the work-piece about the axis parallel with the coincident lines and a common means for oscillating the work-piece about said other axis and for reciprocating the work-holder and tool relatively to each other.

Preferably the means for oscillating and reciprocating the work-holder comprises a cam carried for rotation with the holder one on each side of the holder, and a follower for each cam carried by the bed of the machine.

A practical embodiment of the invention will now be described, merely by way of example, as applied to a machine for cutting the convex surfaces of coincident-line blades of the rotors of gas turbines.

Figure 7:
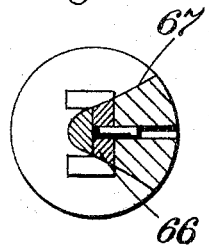
Figure 8:
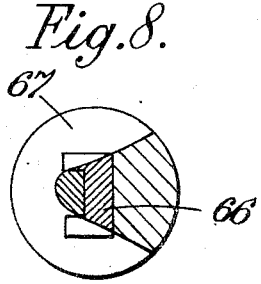

The description will be made with reference to the accompanying drawings whereof:

Figure 1 is a front elevation of a coincident-line blade for the rotor of a gas turbine, Figure 2 is a view in the direction of the arrow 2 of Figure 1 and to an enlarged scale, Figure 3 is a view showing the general arrangement of the machine, Figure 4 is a view in the direction of arrow 4 of Figure 5, certain of the parts being shown in section, Figure 5 is a view in the direction of arrow 5 of Figure 3, this view being to an enlarged scale and showing certain of the parts in section, and Figures 6, 7 and 8 are respectively sections on the lines 6—6, 7—7 and 8—8 of Figure 5.

Referring, first of all, to Figures 1 and 2 of the drawings: the blade, whose convex surface is to be machined, is generally indicated by the reference numeral 10. The blade 10 comprises a root portion 11 by which it is attached to the rotor of the turbine and a vane portion 12 formed integrally therewith. The projected width $a$ (Figure 1) of the vane 12 is constant throughout its length so that the long axis $b$ of the vane lies midway between the entry edge 13 of the vane and its exit edge 14. The surface 15 on one side of the vane 12 is concave throughout its length whilst the surface 16 on the other side of the vane is convex. The curvature of the concave and convex surfaces 15 and 16 respectively at any station along the blade (that is, at any plane normal to the axis $b$) is not constant as it is not a surface of revolution. The profile of the concave and convex surfaces 15 and 16 respectively varies from the root 11 to the tip 17 of the blade. The vane 12 is twisted around the longitudinal axis $b$ from the root to the tip—that is, a line containing the entry and exit edges of the vane at a station near the root (as line $c$, Figure 2) is inclined with respect to another similarly disposed line (as the line $c'$ at the tip 17 of the vane) at another station along the line. The vane thickness at the root of the blade is greater than at the tip so that the curved surfaces taper towards the tip of the blade. This will be evident from Figure 2. The concave and convex surfaces extend linearly along the vane so that straight lines lie on said surfaces. These straight lines—which are referred to throughout the specification as "coincident lines"—are each disposed at an angle to the long axis of the vane. Referring to Figure 1: the lines $d$ are such coincident lines and these, as is clear from the drawing, are inclined with respect to the long axis $b$ and converge towards the blade root. A straight edge placed on the line $d$, or on a line parallel with the line $d$, will be in contact with the surface of the vane throughout its length. The inclination of the lines $d$ with respect to axis $b$ varies but the lines do not cross one another on the surface 16. For convenience throughout the specification blades having coincident lines will be referred to as coincident-line blades.

The machine which is about to be described is adapted to machine the convex surface 16 of the blade 10. The concave surface 15 is cut in another machine subsequent to the convex surface being completed in the present machine.

The blade 10 is produced from a blank constituted by a bar of cold-drawn alloy suitable for use in a gas turbine rotor, the bar being rectangular in cross-section. The strength of such a bar is great and, as the blade is produced from it, the blade also has great strength.

Referring to Figure 3 the machine, which is generally indicated by the reference numeral 20 comprises a bed 21, a work-head, generally indicated by the reference numeral 22, mounted on the bed and a tool-head, generally indicated by the reference numeral 23 also mounted on the bed 21. The tool-head 23 is adjustable by handle 24 along the slide 25 on the bed 21 so as to move the tool-head towards and away from the work-head 22. Such movements are provided for so as to bring the tool into contact with the cold-drawn bar and, if necessary, for infeed purposes.

The tool-head 23 comprises a slide 26, a gear box 27 carried by the slide, an electric motor 28 secured to the gear box, a grinding wheel 29 carried by the gear box and a wheel hood 30 secured to the slide 26 and gear box 27. The electric motor 28 drives the grinding wheel 29 through the gear box 27 in known manner.

The grinding wheel 29 has a cylindrical face the width of which is slightly greater than that of the finished blade, that is, it is slightly greater than the length of the vane 12. In this way, as will be described hereinafter, the length of the vane which is machined is greater than that required and the excess material is removed from the tip 17 of the blade.

The work-holder 22 comprises a frame 31 which is carried by the bed 21 and which in turn supports a slide 32 (see Figure 5). The slide 32 is so mounted on the frame 31 that it is capable of being reciprocated towards, and away from, the tool-head 23. The slide 32 and the tool-head 23 are therefore independently capable of relative movement towards and away from each other.

The slide 32 supports a platform 33 so that when the slide is reciprocated the platform moves with it. On each side of the platform 33 there is provided a pulley 54 to which one end of a rope 55 is secured. The ropes pass over the bed 21 and jockey pulleys 56. The free end of each rope supports a weight 57 which, applying a pull on the platform 33 through the ropes 55, draws the slide 32 away from the tool-head 23.

As shown in Figure 5, the platform 33 supports a pair of bearing blocks 34 which are spaced apart so as to accommodate therebetween a work-holder, generally indicated by the reference numeral 35. Each bearing block receives a shaft 36 by which the work-holder 35 is supported and driven, as hereinafter described.

The platform 33 carries a pin 37 which is received by a bearing bush 38 secured to the slide 32. The arrangement is that the pin 37, with the platform 33, may rotate about a vertical axis within the bush 38.

The platform 33 is therefore capable of two movements. The first is that of reciprocation towards and away from the tool-head due to the fact that the platform is mounted on the slide 32. The second movement is that of oscillation about a vertical axis due to the fact that the platform 33 is mounted on the slide 32 through the agency of the pin 37 and bush 38. Of course, the bearing blocks 34 will also partake of these movements and it will be clear that they may be independently performed or that they may be both performed at the same time.

Each shaft 36 is formed with a projection 39 having a slot 40 to receive a tongue 41 on the work-holder 35. Each tongue 41 is held in position in its slot 40 by a pin 42.

Also carried by each shaft 36 is a cam 43 which co-operates with a follower 44 (Figure 4) carried by a bracket 45 which is bolted to the frame 31 of the work-head. The cams 43 are held in engagement with the followers 44 by means of the pulley and rope devices 54, 55 described above.

The pulley 54, on the right hand side of Figures 3, 4 and 5, is formed with teeth 46 which are adapted to co-operate with similarly formed teeth on a shaft 47. The teeth on the pulley 54 and on the shaft 47 constitute a dog clutch which is engaged when the shaft 47 is moved towards the pulley. Disengagement is effected by movement of shaft 47 in the opposite direction. The shaft 47 is moved to engage and disengage the clutch by a hand lever 48 which is pivotally mounted at 49, the lever 48 passing through a rod 50 which is bolted or otherwise secured to the shaft 47. The shaft 47 is splined as at 51 to carry a worm wheel 52 which is driven by a worm 53.

From what has been said it will be clear that the drive from the worm wheel 52 will be applied to the shaft 47 and that, if the clutch 46 is engaged, this drive will be transmitted to the shaft 36 and the cam 43 on the right hand side of Figure 5. When the work-holder 35 is mounted in position, as described above, this drive will be transmitted from the right hand shaft 36 to the left hand shaft 36 and so to the left hand cam 43.

Referring now to Figure 3 the worm wheel 52 is driven through the worm 53 from a shaft 58. The shaft 58 extends from the worm 53 to a gear box assembly indicated at 59. Power is applied to the gear box either from an electric motor 60 or by a hand wheel 62. The gear box 59 has a hand lever 63 whereby either the hand wheel 62 or the motor 60 is coupled to the shaft 58 through gear box 59 at the will of the operator. The hand wheel is normally used when the machine is being set up ready for the cutting operation. The work-holder is normally driven by the motor 60 during the cutting operation and it is arranged that the cutting operation takes under a minute in the particular arrangement being described.

The shaft 58 is made in two co-axial parts which are joined together by a sleeve 64, the sleeve being splined on the two parts of the shaft so as to transmit the drive from the one part to the other. This arrangement is provided to ensure that when the platform 33 is reciprocated and /or oscillated, as hereinafter more fully described, the shaft 58 will allow for such movements whilst continuing the drive from the motor 60 to the work-holder 35.

The work-holder 35 comprises a blade carrier 67 centrally formed with a stepped, transverse slot generally indicated at 65. The blade carrier 67 is formed with the tongue 41 above referred to. The lower part of the stepped slot is flat and forms a table to receive a saddle 66 (Figure 4). The saddle 66 is secured to the blade carrier 67 by the bolts 68. A portion of the stepped part of the slot 65 lies on each side of the saddle 66 and each such part carries a finger 69. The adjacent ends of the fingers 69 overhang the saddle 66. The workpiece 70, whose convex surface is to be machined, is placed upon the saddle 66 and each end of it is gripped by one of the fingers 69 so that the workpiece is firmly held on the saddle. The fingers 69 are clamped in position by means of the screws 71.

In the description of the blade given above it was stated that the thickness of the blade decreases over the length. To allow for this the saddle 66 has a tapering face to receive the workpiece 70.

The distance between the adjacent ends of the fingers 69 is such as to accommodate the grinding wheel 29.

The machine will normally be adapted for grinding the convex surface of blades of different lengths. It is preferred that, for each length of blade, there be provided a respective workholder. However, all of the work-holders are of the same construction in so far as the tongues 41 are concerned so that they are interchangeable in the machine. This interchangeability is readily performed since it only requires that the pins 42 be withdrawn and the work-holder slid out of pieces 39.

To enable the required shape to be imparted to the work-piece without the grinding disc interfering with the work-holder it is arranged that part of the blade carrier 67 which lies behind the saddle 66 be of relatively small arcuate extent as shown in Figures 7 and 8. The saddle 66 at each end is of channel section but in the operative region it is suitably cut away as is clear from Figures 7 and 8. The channel formation of the saddle 66 effectively supports the work-piece 70 and it will be observed from these two figures that this channel formation is partly retained over the length of the saddle.

To ensure that the maximum support for the work-piece is obtained from the saddle and that at the same time, the saddle does not interfere with the grinding disc, it is preferred that the saddle be initially formed throughout its length as of full channel section. The saddle is first rough machined in a milling machine and is then mounted in the work-holder and the latter is driven as when machining the convex surface of the blade which the saddle is to carry. The grinding disc will then remove the unwanted material from the saddle.

In use, the work-piece 70—in the form of a length of cold-drawn rectangular bar—is inserted in the work-holder 35 after the latter is mounted between the pieces 39 and after cams 43 are secured to the shaft 36, these cams 43 having the required profile to produce the blade in question. With the work-piece clear of the grinding disc the tool-head 23 is advanced to a predetermined position at which it will engage and shape the work-piece. The clutch 46 is then engaged and the motor 60 is started. As a consequence the work-holder is driven so that the work-piece is moved around the horizontal axis about which the shafts 36 rotate to carry it past the grinding wheel 29 whilst in engagement therewith. It may be found sufficient for the work-holder to be thus moved past the grinding wheel 29 once only to complete the machining operation. Alternatively this may be done several times, in which case, at the end of each such cutting operation the tool-head 23 is advanced for infeed purposes.

During the oscillation of the work-holder 35 to form the convex surface of the blade the cams 43—which rotate as one with the work-piece—are in engagement with their followers 44. With the arrangements described rotation of the cams may result in the slide 32 being reciprocated and/or the platform 33 being oscillated relatively to the slide 32. Thus, if the cams have the same lift at the same time the platform 33 will not oscillate relatively to the slide 32 but the latter will be moved as a whole away from the tool-head 23. However, if the left hand cam 43 has a greater lift at any instant than the right hand cam 43 then the platform 33 will be oscillated in an anti-clockwise direction as viewed in Figure 3. Again if the left hand cam 43 has greater lift than the right hand cam the platform 33 will oscillate in a clockwise direction. It will be apparent that by suitably designing the cams it is possible to arrange for the platform to reciprocate and/or oscillate and therefore to move the work-piece relatively to the grinding wheel 29 so that a desired shape is imparted to the convex surface.

The work-piece is mounted in the work-holder so that the wheel 29 engages the work-piece along a coincident line and successive lines are brought parallel with the axis of rotation of the wheel. To provide a surface with inclined coincident lines the cams 43 tilt the platform 35 so that the axis of shafts 36 is inclined with respect to the axis of wheel 29. The convex surface of the workpiece will therefore be of conic form so that the coincident lines lying on the surface converge towards the root of the blade. Of course, if necessary the cams may be designed to vary the inclination of the axes of shafts 36 and wheel 29 as the workpiece is carried across the wheel to take account of changes in the conic form over the width of the blade—which means that the convergence of the coincident lines at different parts of the blade will vary.

The workpiece is supported on the saddle 66 so that it is inclined with respect to the cutting face of the wheel 29 whereby the convex surface which is produced will have a desired inclination and the thickness of the vane at the root will be greater than at the tip.

As indicated, the movements of the workpiece, as it is rocked past the grinding wheel, are such that the complex shape of the convex surface described above is produced in a single machining operation. Of course, if desired, a grinding operation may be followed by a honing operation in a similar machine.

When the convex surface has been produced the workpiece is removed from the machine and subsequently further machined so as to form the root of the blade and the concave surface. The excess material at the tip of the vane is removed after both the convex and concave surfaces have been formed so that the vane is the required length.

Whilst in the machine described the tool was in the form of a grinding wheel it is to be understood that it may be a milling cutter.

The machine described forms the convex surface 16 of the blade 10 with straight coincident lines $d$ which are inclined the one to the other. These lines are straight in the sense that, at any section through the blade in a plane containing the line of contact of the blade with the grinding wheel and the axis of rotation of the wheel, the convex surface is straight. This is due to the grinding wheel being cylindrical. However, the coincident lines may be curved in this sense and to this end it is sufficient that the periphery of the grinding wheel be convex and/or concave. Alternatively the lines may be part straight, part curved.

With the arrangement described in connection with the drawings the coincident lines were inclined, but not so as to cross one another on the convex surface. However, the coincident lines may be parallel either when straight or when curved. To this end the cams 43 are designed so that the axes of shafts 36 and of wheel 29 are parallel.

Whether the coincident lines be straight or curved and inclined or parallel it is necessary that there be a gradual transition in shape across the blade to ensure that with the machine described the coincident lines may conveniently be brought successively into contact with the grinding wheel.

From the foregoing it will be appreciated that a machine as described is adapted to form a convex surface on a workpiece, the surface having coincident lines with the following properties:

(a) They are straight and/or gradually curved (concave or convex).

(b) They do not cross one another on the surface, and (c) They are parallel or inclined to one another.

A convex surface with lines having these properties is a coincident-line surface and a piece having such a surface is a coincident-line piece (for example, a coincident line blade).

Although in the preferred arrangement the blade is produced from a solid bar it is to be understood that hollow stock may be used for making hollow blades. The machine may also be used for finish-machining part-fabricated blades e. g. forged blades.

Finally, the machine may be used for producing a convex surface on coincident-line pieces other than turbine blades. For instance, the coincident-line piece may be a compressor or fan blade.

We claim:

1. A milling, grinding, honing or the like machine for producing or finishing a convex surface on coincident line blades of turbines, compressors or the like, comprising a bed, a work-head and a tool-head carried by the bed, a work-holder mounted on the work-head for angular movement about a first and second axis normal to each other, the first axis being selected so that the coincident lines of the blade are always parallel to it and to the axis of rotation of the tool, a cylindrical-faced rotary tool carried by the tool-head and having a face width at least equal to the length of the blade, said tool being mounted to engage the blade along a coincident line, means for driving the tool, means for turning the work-piece about its axis which is parallel with the coincident lines and a cam one on each side of the work-piece, for oscillating the work-piece about said second axis and for reciprocating the work-holder and tool towards and away from each other, said work-holder comprising a saddle to support the work-piece, a pair of fingers one to engage each end of the work-piece to hold it to the saddle with the face to be machined exposed between the fingers and a clamp at each end of the holder to secure it to a pair of spaced co-axial shafts by which the holder is moved angularly about the axis parallel to the coincident lines.

2. A machine according to claim 1 wherein the clamp comprises a tongue-and-groove connection and means for holding the two elements of the connection together.

3. A machine according to claim 2 wherein the cam and follower are maintained in engagement by means comprising a pulley carried by each cam shaft, a rope secured to the pulley and a weight on the rope acting to draw the cam against its follower and to rotate the holder in one direction.

FREDERICK WILLIAM WHITEHEAD.
WILLIAM HENRY BEDFORD.

REFERENCES CITED

The following references are of record in the file of this patent:

UNITED STATES PATENTS

| Number | Name | Date |
|---|---|---|
| 481,259 | Feicker | Aug. 23, 1892 |
| 1,085,381 | Di Gianni | Jan. 27, 1914 |
| 2,373,827 | Halford | Apr. 17, 1945 |

FOREIGN PATENTS

| Number | Country | Date |
|---|---|---|
| 491,679 | Great Britain | Sept. 7, 1938 |